Figure 1:
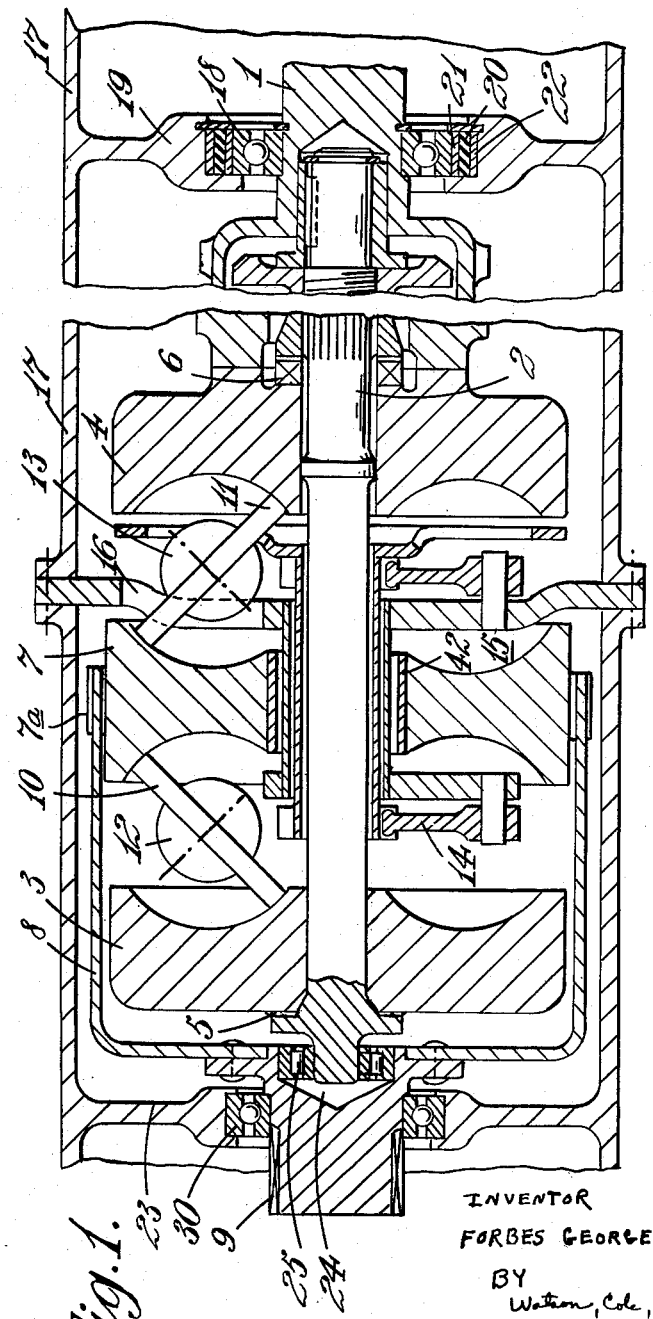

May 16, 1961 F. G. DE BRIE PERRY 2,984,118
INFINITELY VARIABLE CHANGE SPEED GEARS
Filed Sept. 10, 1957 2 Sheets-Sheet 1

INVENTOR
FORBES GEORGE DE BRIE PERRY
BY
Watson, Cole, Grindle & Watson
ATTORNEYS May 16, 1961  F. G. DE BRIE PERRY  2,984,118
INFINITELY VARIABLE CHANGE SPEED GEARS
Filed Sept. 10, 1957  2 Sheets-Sheet 2
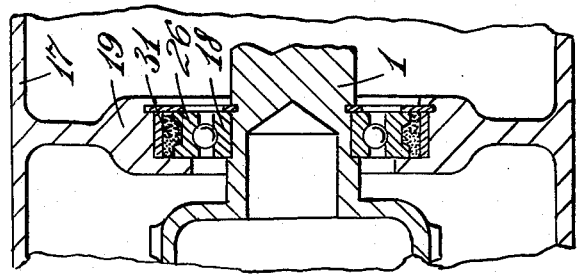
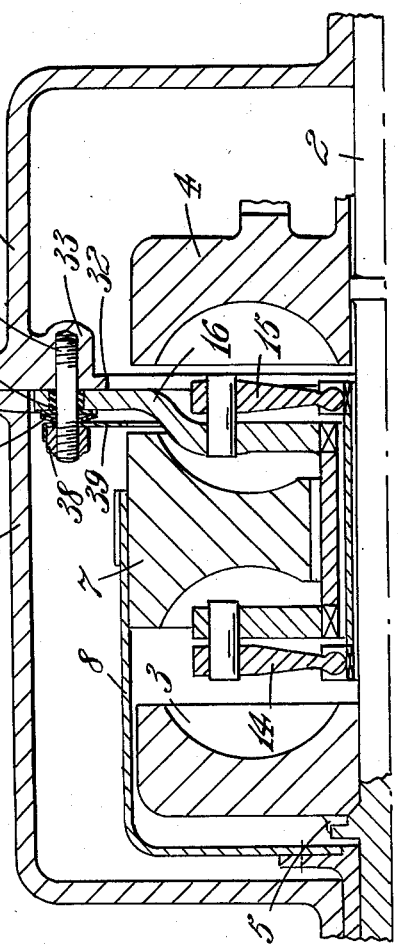
INVENTOR
FORBES GEORGE DE BRIE
PERRY
BY
Watson, Cole, Grindle & Watson
ATTORNEYS

United States Patent Office 2,984,118
Patented May 16, 1961

2,984,118
INFINITELY VARIABLE CHANGE SPEED GEARS

Forbes George de Brie Perry, Felbridge, near East Grinstead, England, assignor, by mesne assignments, to National Research Development Corporation, London, England, a British corporation Filed Sept. 10, 1957, Ser. No. 683,108

Claims priority, application Great Britain Sept. 11, 1956

10 Claims. (Cl. 74—200)

This invention relates to infinitely variable change speed gears of the friction type having a first torus disc and a second torus disc connected through a plurality of rollers having their centres spaced around an axis, the axes of the first and second torus discs and the axis about which the rollers are spaced being substantially in alignment to constitute a common axis, and the rollers being tilted, so that their axes make an angle with the said common axis, to vary the speed ratio of transmission through the gear. Such an infinitely variable change speed gear is referred to hereinafter as being "a gear of the type hereinbefore described."

Essentially, such a gear has three component parts; the first torus disc, the second torus disc and an assembly of rollers, roller carriers and rocker gear. One of these components is fixed against axial rotation while a second is driven and the output drive is taken from the third. It is practically most convenient to fix the assembly of rollers, roller carriers and rocker gear, and in known gears this assembly is rigidly fixed by a spider attached to a fixed outer casing while the first torus disc is driven from an input shaft and the second torus disc drives the output shaft.

In the Hayes gear, which is a practical example of infinitely variable change speed gear of the type hereinbefore described, an input shaft drives two, inwardly-facing torus discs axially spaced on a drive shaft about a double, outwardly-facing torus disc connected by a drum to an output shaft. Two assemblies of rollers, roller carriers and rocker gear are provided, one between each face of the double torus disc and each of the torus discs driven from the input shaft. In this gear, the rocking of the rollers is effected automatically by precession and the gear also includes means to generate frictional engaging pressure between the torus discs and the connecting rollers.

For proper functioning and long life of the transmission it is necessary for the roller loads to be shared equally among the rollers connecting a pair of torus discs.

If the roller centres are fixed but in slightly displaced relationship to the drive shaft axis, then, with the drive shaft also rigidly supported by bearings in the casing, very large loads may be generated on the rollers in forcing alignment. The loads involved are negligible when the rollers are parallel to the shaft axis in the 1:1 gear ratio position, but they rapidly become serious as soon as the rollers are inclined to the axis of the drive shaft in reduction or overdrive positions. In the high reduction position, the roller angle is about 60 degrees to the drive shaft axis and the rollers form a rigid structural assembly radially connecting the input and output torus discs. Alignment between discs and rollers is enforced by axial loading and extremely high extra stresses are thus caused by the side loading and bending deflection of the drive shaft which is already under tension due to the engaging pressure between discs and rollers. For this reason, a decrease in the fatigue life of the whole transmission occurs. It is the object of the present invention to meet this difficulty.

According to the present invention, there is provided a gear of the type hereinbefore described wherein the component parts are so mounted as to permit small radial movement of one of the three axes relative to the other two of the three axes, the three axes being the axis of the first torus disc, the axis of the second torus disc and the axis about which the centres of the rollers are spaced.

According to one form of the invention, the shaft carrying the first torus disc or discs is mounted in a flexible mounting so as to permit small radial movement of the first torus disc axis relatively to the other two axes.

In this case, according to features of the present invention, the flexible mounting may comprise a spring element surrounding one of the shaft bearings or a synthetic rubber ring bonded to inner and outer metal sleeves and surrounding one of the shaft bearings.

According to another form of the invention, the assembly of rollers, roller carriers and rocker gear is carried on a circular member which is connected to the outer casing through a resilient member so as to permit small radial movement of the axis about which the centres of the rollers are spaced relatively to the other two axes. When the form of the invention just defined is adopted, said resilient member may, according to further features of the invention, comprise a spring element or a member of synthetic rubber.

In a still further form of the invention the second torus disc has a mechanical clearance permitting small radial movement of the axis of the second torus disc relative to the other two axes.

In this case, the second torus disc may be connected to a drum by a flexible connecting member, the drum being fixed to an output shaft.

If desired, the component parts may be mounted so as to permit small radial movement to more than one of the said three axes at the same time.

In a still further form of the invention, the shaft carrying the first torus disc or discs is mounted in silicone putty. This permits the required radial movement of the shaft while also providing viscous damping of the shaft in radial directions.

A gear according to the invention may have two inwardly facing first torus discs axially spaced about a double, outwardly facing second torus disc, and in this case, according to a further feature of the invention, at least one of the first torus discs may be mounted on its shaft so as to be self-aligning angularly. If desired, both of the first torus discs may be mounted so as to be self-aligning angularly.

In order that the invention may readily be carried into effect, three embodiments will be now described, by way of example, with reference to the accompanying drawings, in which:

Figure 1 is a longitudinal sectional view of an infinitely variable change speed gear of the type hereinbefore described in which the axis of one of the first, or input, torus discs and the axis of the second, or output, torus disc are permitted slight radial movement, Figure 2 is a modified form of the gear shown in Figure 1, in which the axis about which the centres of the rollers are spaced is permitted a small radial movement, and, Figure 3 is a detail view showing an alternative arrangement to that shown in Figure 1.

In Figure 1, a drive shaft 2 is driven by an input shaft 1. Two inwardly-facing first torus discs 3 and 4 are secured by dogs 5 and 6 respectively to the drive shaft 2. A double, outwardly-facing second torus disc 7 is connected by a flexible connecting member 7a to a drum 8 which is in turn fixed to an output shaft 9. Two assemblies of rollers, roller carriers and rocker gear are provided one between the torus discs 3 and 7 and the other between the torus discs 4 and 7. Each assembly comprises three rollers having their centres spaced 120° around an axis substantially coinciding with the axis of the drive shaft 2.

In the view of Figure 1, one only of the rollers of each assembly is shown at 10 and 11 respectively with its associated roller carrier 12 and 13 respectively. A rocker gear for each of the two assemblies is indicated generally at 14 and 15 respectively and these are rigidly fixed by a spider 16 to a fixed outer casing 17 which extends co-axially with the gear enclosing all its parts.

The input shaft 1, and with it the input end of the drive shaft 2, is carried by a ball bearing 18 secured to an inwardly extending flange 19 of the casing 17 by a flexible mounting comprising a synthetic rubber ring 20 bonded to inner and outer metal sleeves 21, 22 respectively.

The gear end of the output shaft 9 is carried by a ball bearing 30 secured to an inwardly extending flange 23 of the casing 17. The output end of the drive shaft 2 extends into a recess 24 in the gear end of the output shaft 9 where it is carried by a roller bearing 25. The second torus disc 7 is provided with a plain safety bearing 42 having radial clearance to permit limited radial, axial and angular alignability of the disc 7.

Figure 3 shows an alternative means for retaining the input shaft 1 in the flange 19 and with the input shaft 1 the input end of the drive shaft 2. In Figure 3, parts corresponding to those shown in Figure 1 are indicated by the same reference numerals. In this arrangement, the ball bearing 18 has its outer race 26 supported in the flange 19 by a ring of silicone putty 31.

Silicone putty is a substance which is strongly resistant to shock deformation but which flows under steadily applied pressure. Thus, the composite bearing at the gear end of the input shaft 1 shown in Figure 1 is resistant to sudden and alternating forces tending to deform it such as occur in vibration but will accommodate itself to steadily applied forces, so allowing the input shaft 1 to align itself. At the same time viscous damping of movement of the drive shaft 2 is provided.

In the arrangement shown in Figure 2, corresponding parts to those shown in Figure 1 are indicated by the same reference numerals. The rocker gears shown generally at 14 and 15 and therefore the associated roller carriers 12, 13 (not shown in the view of Figure 2) and rollers 10, 11 (not shown in the view of Figure 2) are held against axial rotation by attachment to the casing 17 as in the arrangement of Figure 1.

In the arrangement of Figure 2, however, the spider 16 is connected to the casing 17 through resilient members at six attachment points equally spaced about the gear axis. As shown in Figure 2, which shows one of the attachment points in section, the part of the casing 17 at the input end of the gear has an inwardly extending part 32 having increased thickness at 33 to receive a stud 34. The spider 16 has corresponding apertures of greater diameter than the stud diameter to receive a resilient member 35 between the stud 34 and the spider 16. The resilient member 35 may be either rubber or a spring member as preferred.

The spider 16 is pressed against the casing part 32 by a washer 36 held resiliently against the face of the spider 16 by a Belleville washer 37. The Belleville washer 37 is retained by a nut 38 locked on the stud 34 by a locking strip 39.

In the arrangement shown in Figure 2, radially rigid bearings may be used to carry the drive shaft 2 and, for this reason, the bearings are not shown in the drawing.

With this arrangement, a high degree of accuracy in locating the centres of the rollers relatively to the casing is not necessary. Further, some measure of shock damping is given to the rollers, since their centre reaction is provided by the resilient mounting.

I claim:

1. An infinitely variable change speed gear of the friction type, the gear comprising a casing, co-axial input and output shafts spaced apart and journalled in said casing one in a bearing carried from said casing by a mounting which permits small radial movement of the bearing, a drive shaft co-axial with said input and output shafts and journalled in end bores in the facing ends of the input and output shafts, a first torus disc carried on said drive shaft, means drivably connecting said input shaft with said first torus disc, a drum carried by said output shaft, a second torus disc carried by said drum, a spider carried from said casing, and a plurality of rockable rollers carried from said spider, the rollers drivably connecting said first torus disc with said second torus disc.

2. An infinitely variable change speed gear of the friction type, the gear comprising a casing, co-axial input and output shafts spaced apart and journalled in said casing, a drive shaft co-axial with said input and output shafts and journalled in end bores in the facing ends of the input and output shafts, a first torus disc carried on said drive shaft, means drivably connecting said input shaft with said first torus disc, a drum carried by said output shaft, a second torus disc, a flexible mounting connecting said second torus disc with said drum, said flexible mounting permitting small radial movement of the axis of said second torus disc, a spider carried from said casing, and a plurality of rockable rollers carried from said spider, the rollers drivably connecting said first torus disc with said second torus disc.

3. An infinitely variable change speed gear of the friction type, the gear comprising a casing, co-axial input and output shafts spaced apart and journalled in said casing, a drive shaft co-axial with said input and output shafts and journalled in end bores in the facing ends of the input and output shafts, a first torus disc carried on said drive shaft, means drivably connecting said input shaft with said first torus disc, a drum carried by said output shaft, a second torus disc carried by said drum, a spider, resilient means supporting said spider from said casing, said resilient means permitting small radial movement of said spider relative to the axis of said drive shaft, and a plurality of rockable rollers carried from said spider, the rollers drivably connecting said first torus disc with said second torus disc.

4. An infinitely variable change speed gear of the friction type, the gear comprising a first torus disc and a second torus disc each rotatable about an axis, a plurality of rockable rollers spaced around an axis and drivably connecting said first torus disc and said second torus disc, a drive shaft carrying said first torus disc and flexible mounting means coupled to said drive shaft which permits small radial movement of the axis of said first torus disc relative to the other two axes.

5. A gear as claimed in claim 4 wherein said flexible mounting means comprises an input shaft coupled to said drive shaft, a bearing in which said input shaft is supported and a spring element surrounding and supporting said bearing.

6. An infinitely variable change speed gear of the friction type, the gear comprising a first torus disc and a second torus disc each rotatable about an axis, a plurality of rockable rollers spaced around an axis and drivably connecting said first torus disc and said second torus disc, a spider carrying said rollers, a casing and resilient means connecting said spider to said casing, which resilient means permits small radial movements of the axis about which said rollers are spaced relative to the other two axes.

7. A gear as claimed in claim 6 wherein said resilient means comprises a plurality of resilient elements interconnecting said spider with said casing.

8. An infinitely variable change speed gear of the friction type, the gear comprising a first torus disc and a second torus disc each rotatable about an axis, a plurality of rockable rollers spaced around an axis and drivably connecting said first torus disc and said second torus disc, an output shaft, a drum fixed to said output shaft and a flexible connecting member connecting said second torus disc with said drum and permitting small radial movements of the axis of said second torus disc relative to the other two axes.

9. An infinitely variable change speed gear of the friction type, the gear comprising a first torus disc and a second torus disc each rotatable about an axis, a plurality of rockable rollers spaced about an axis and drivably connecting said first torus disc and said second torus disc, a drive shaft carrying said first torus disc, an input shaft coupled to said drive shaft and a silicone putty mounting supporting said input shaft and permitting small radial movements of the axis of said first torus disc relative to the other two axes.

10. An infinitely variable change speed gear of the friction type, the gear comprising a first torus disc and a second torus disc each rotatable about an axis, a plurality of rockable rollers spaced around an axis and drivably connecting said first torus disc and said second torus disc, a drive shaft carrying said first torus disc, a second shaft coupled to said drive shaft and a flexible mounting in which said second shaft is mounted and which permits small radial movements of the axis of said first torus disc relative to the other two axes, said flexible mounting comprising a bearing in which said second shaft is supported, an inner metal sleeve surrounding and supporting said bearing, an outer metal sleeve surrounding and spaced from said inner metal sleeve and a rubber ring between and bonded to said inner and outer metal sleeves.

References Cited in the file of this patent

UNITED STATES PATENTS

| | | |
|---|---|---|
| 2,152,796 | Erban | Apr. 4, 1939 |
| 2,157,259 | Delaval-Crow | May 9, 1939 |
| 2,730,904 | Rennerfelt | Jan. 17, 1956 |